2,829,045

PROCESS OF EXTRACTING PRECIOUS METALS FROM THEIR ORES BY THE USE OF ALPHA-HYDROXYNITRILES

Erwin L. Carpenter and Norman Hedley, Stamford, Conn., assignors to American Cyanamid Company, New York, N. Y., a corporation of Maine No Drawing. Application January 22, 1957
Serial No. 635,134

9 Claims. (Cl. 75—105)

This invention relates to a process of extracting precious metals from their ores by the use of alpha-hydroxy nitriles.

In the extraction of cyanidable precious metals, particularly gold and silver, from their ores one of the more important processes has been that of cyanidation, both of the metals forming soluble compounds with cyanides, the metal usually forming part of a complex anion. The standard reagents used are alkali metal cyanides, such as sodium and potassium cyanide, or alkaline earth metal cyanides, of which crude calcium cyanide prepared from calcium cyanamide is of primary commercial importance. These cyanides are usually figured in terms of equivalent of pure sodium cyanide. Particularly in the recovery of gold which is present in minute amounts in most ores, a very large excess of cyanide is necessary far beyond that which is stoichiometrically equivalent to the gold present. However, in the case of many ores, the cost of cyanide represents a major portion of the total chemical treatment cost and, if excessive, can render the treatment of certain ores economically impractical.

The alkali and alkaline earth metal cyanides are normally used in very strongly alkaline circuits, for example those having pH's of 11 or 12 or higher. The particular alkalinity to be used will vary from ore to ore and with some very refractory ores no practical extraction with inorganic cyanides is possible. This has resulted in a very serious limitation in the cyanidation of some precious metal ores, although with those ores which are suitable for cyanidation with inorganic cyanides excellent extractions with moderate cyanide consumption are often possible and with these ores inorganic cyanides leave but little to be desired.

The present invention depends on the use of a certain particular class of organic nitriles, namely alpha-hydroxy cyanides of the aliphatic or aralkyl series. The compounds apparently do not behave as do the common inorganic cyanides. At least their remarkable differences in the case of certain ores would indicate some difference in the reaction mechanism. Just exactly what the mechanism is in the case of different ores has not been completely determined, and it is therefore not desired to limit the invention to any particular theory.

That it is not a simple problem of using a compound which somewhere in its molecule has the CN group is shown by the fact that most nitriles cannot be used at all under any circumstances to recover precious metals from their ores. Only a particular type of nitrile having an alpha-hydroxy group is usable, other types of nitriles giving no extractions. Although, as has been pointed out above, the present invention is not limited to any theoretical reaction mechanism, the precious metals are dissolved in a form in which they are complexed with cyanogen compounds and the effectiveness of the alpha-hydroxy nitriles of the present invention is in proportion to their CN content. Therefore, as in the case of inorganic cyanides such as impure calcium cyanide, the weights used will be given in terms of sodium cyanide equivalent; that is to say, the weights which contain the same number of CN groups as would an equivalent amount of pure sodium cyanide.

It is an advantage of the invention that the alpha-hydroxy nitriles are quite generally usable. We have encountered no ore which is practically amenable to cyanidation with inorganic cyanides which cannot also be effectively and efficiently treated with alpha-hydroxy nitriles, and in addition there are ores in which the alpha-hydroxy nitriles produce results which cannot be attained with any inorganic cyanide. This much greater uniformity of usefulness constitutes an important practical advantage as the alpha-hydroxy nitriles may be sold generally as precious metal extraction reagents.

While excellent results are obtainable with alpha-hydroxy nitriles alone, it is possible to mix them with inorganic cyanides but such mixtures are only efficient with ores which are amenable to practical cyanidation with inorganic cyanides. The present invention therefore includes mixtures in the cases of such ores as can be cyanided effectively with inorganic cyanides alone.

Among the common alpha-hydroxy nitriles are lactonitrile, alpha-hydroxy isobutyronitrile, glycolonitrile, mandelonitrile, etc. In the latter case, where the nitrile is of an aralkyl series, the weight of reagent becomes greater for a given CN content and, therefore, these higher molecular alpha-hydroxy nitriles suffer from the disadvantage that larger amounts have to be used to obtain the same CN content. As a result, since there is no substantial difference in activity, lactonitrile is preferred because it has a very high percentage of CN of any of the alpha-hydroxy nitriles. It is another advantage of the present invention that the alpha-hydroxy nitriles do not have to be pure, and crude lactonitrile obtained as a by-product in the acrylonitrile manufacture can be used. Such crude by-products are often obtainable at a very low cost and since they are just as effective for a given CN content as pure chemicals, they are in general preferred for economic reasons.

The invention will be described in greater detail in conjunction with the specific examples in which a number of reagents and ores are treated. In each case conditions of operation for maximum efficiency are used, which results in the use of somewhat different pH's with different ores.

Example 1

A gold ore from Nevada assaying 0.21 oz. of gold per ton and 3.12% arsenic, present as orpiment and realgar, was ground to 39% —200 mesh. Various 600 g. portions of the ground ore were diluted with water to 25% solids, the pH adjusted with calcium hydroxide and subjected to the usual cyanidation procedure for 24 hours, which time has been found preferable for this ore. One of the samples was treated with 1.74 g. of lactonitrile (0.64 g. CN content). The other two were treated with 1.2 g. sodium cyanide which gives the same CN content. The natural pH was 6.6 in the case of lactonitrile, 6.7 in the case of one portion treated with sodium cyanide, and lime was added in the case of the third portion to produce a pH of 11.0. Each portion was extracted for 24 hours.

After extraction was complete the pulp was filtered, the gold precipitated from the filtrate and assayed. The metallurgical results appear in the following table:

| pH | Reagent Added | | | Residue, Au, Oz./ton | Extraction, Au, percent | Consumption, CN, gms. | Consumption, NaCN Equiv., lb./ton |
|---|---|---|---|---|---|---|---|
| | Lactonitrile, gms. | Sodium Cyanide, gms. | CN Content, gms. | | | | |
| 6.6 | 1.74 | | 0.64 | 0.080 | 63.9 | 0.04 | 0.25 |
| 6.7 | | 1.20 | 0.64 | 0.078 | 64.2 | 0.63 | 3.95 |
| 11.0 | | 1.20 | 0.64 | 0.097 | 53.8 | 0.63 | 3.95 |

It will be noted that with this very refractory ore an extraction of almost 64% was obtained with lactonitrile with a consumption of only 0.25 pound NaCN equivalent per ton. In this table, as in all of the examples, the amount added corresponded to the same CN content. NaCN equivalent consumption was at least as great in the case of NaCN and the alpha-hydroxy nitriles. The metallurgical results are shown in the following table.

| Nitrile Tested | pH of Solution | Amount Added | | Residue, Au, oz./ton | Extraction, Au, percent | Consumption, CN, gms. | Consumption, NaCN Equiv., lbs./ton |
|---|---|---|---|---|---|---|---|
| | | Nitrile, gms. | CN Content, gms. | | | | |
| NaCN | 11.2 | | 0.64 | 0.005 | 98.4 | 0.29 | 1.55 |
| Lactonitrile | 11.2 | 1.74 | 0.64 | 0.005 | 98.6 | 0.29 | 1.55 |
| α-hydroxy isobutyronitrile | 11.2 | 2.08 | 0.64 | 0.005 | 98.5 | 0.11 | 0.57 |
| Glycolonitrile | 11.2 | 1.40 | 0.64 | 0.010 | 97.3 | 0.31 | 1.61 |
| Mandelonitrile | 11.2 | 3.27 | 0.64 | 0.010 | 97.3 | 0.15 | 0.81 |
| Acrylonitrile | 11.2 | 1.30 | 0.64 | 0.345 | Nil | | |
| Acetonitrile | 11.2 | 1.25 | 0.64 | 0.338 | Nil | | |
| Succinonitrile | 11.2 | 0.98 | 0.64 | 0.335 | Nil | | |
| Hydracrylonitrile | 11.2 | 1.74 | 0.64 | 0.347 | Nil | | |

CN consumption is obtained by determining the amount of reagent which has been consumed and is not recoverable for reuse. This is in accordance with standard metallurgical practice. The consumption of NaCN equivalent with sodium cyanide is almost 16 times as great for approximately the same extraction. At pH 11 the consumption of NaCN equivalent with sodium cyanide is just as great but the extraction has dropped to 53.8, confirming the common experience that for this ore a relatively low pH of just under 7 is the optimum for maximum extraction. The cost of operation as far as reagent is concerned is very low with lactonitrile and because of the refractory nature of the ore, permitting only moderate extractions of gold, the tremendous reagent cost differential is vital.

*Example 2*

The procedure of Example 1 is repeated on two portions of the same ore at pH 6.7 using the same CN content (0.64 g.) of alpha-hydroxy isobutyronitrile and glycolonitrile, respectively. NaCN equivalent consumption was the same as with lactonitrile and recoveries were 64.0 and 63.7, respectively. The extraction percentages are substantially identical with Example 1 as the experimental variation is at least .3%.

*Example 3*

A South African ore assaying 0.343 oz. gold per ton was ground to 93% −200 mesh and divided into 600 g. portions. Each portion was extracted as in Example 1 for 48 hours, the pH being adjusted to 11.2 by lime. The different portions were treated with different nitriles and one portion with sodium cyanide. In each case, the It will be noted that the alpha-hydroxy nitriles gave results and consumptions as favorable as NaCN. The figures in the table are the actual assays but the differences in the case of the first three are within the normal variation from test to test.

*Example 4*

The procedure of Example 3 was repeated with a 600 g. sample of a Canadian ore assaying 0.29 oz. gold per ton using lactonitrile.

*Example 5*

Example 4 was repeated with an ore from the Gold Coast assaying 0.268 oz. gold per ton. In this case the ore was ground to 91% −200 mesh.

*Example 6*

The procedure of Example 4 was repeated with a Mexican ore assaying 0.201 oz. gold and 15.69 oz. of silver per ton. The ore was ground to 63% −200 mesh, but because of the large amount of silver, three times as much lactonitrile was added.

The results of Examples 4–6 are shown in the following table.

| Ore | pH of Solution | Amount of Lactonitrile Added | | Residue | | Extraction | | Consumption, CN, gms. | Consumption, NaCN Equiv., lbs./ton |
|---|---|---|---|---|---|---|---|---|---|
| | | Wt. of Compound, gms. | CN Content, gms. | Au, oz./ton | Ag, oz./ton | Au, percent | Ag, percent | | |
| Ex. 4 | 11.2 | 1.74 | 0.64 | 0.025 | | 91.4 | | 0.46 | 2.57 |
| Ex. 5 | 11.2 | 1.74 | 0.64 | 0.015 | | 94.4 | | 0.39 | 2.21 |
| Ex. 6 | 11.2 | 5.22 | 1.92 | 0.018 | 2.92 | 91.0 | 81.4 | 0.71 | 4.00 |

*Example 7*

A carbonaceous Canadian ore analyzing 0.313 oz. gold per ton and 1.12% carbon was ground to 93% −200 mesh and portions cyanided for 48 hours with various cyanidation reagents. As in the preceding examples, the figures for lactonitrile are NaCN equivalents. In each case the pH was 11.2. The results of the different reagents are shown in the following table.

| Reagent Used | | Residue, Au, oz./ton | Extr., Au, percent |
|---|---|---|---|
| Name | Amt. Used, lb./ton | | |
| NaCN | 4.0 | 0.288 | 4.0 |
| Crude lactonitrile | 4.0 | 0.17 | 45.0 |
| Crude lactonitrile | 8.0 | 0.155 | 49.0 |
| Mandelonitrile | 4.0 | 0.123 | 59.7 |

It will be noted that with this gold ore, which is practically unamenable to cyanidation with sodium cyanide, lactonitrile in a reasonable consumption gave 45% extraction, more than 11 times that of NaCN; mandelonitrile gave practically 15 times the extraction of sodium cyanide. That the 4 lb./ton usage was not far from optimum is shown because doubling the amount of crude lactonitrile increases extraction only 4%. It is not known why the alpha-hydroxynitriles are capable of fair extractions on a carbonaceous ore that cannot be practically touched with sodium cyanide and, therefore, the invention, as applicable to certain refractory carbonaceous ores, is not intended to be limited to any theoretical mechanism.

We claim:

1. In a process of extracting cyanidable precious metals from ores containing the same in which the ore is ground and formed into an aqueous pulp, the improvement which comprises subjecting said aqueous pulp to extraction in the presence of an effective amount of an alpha-hydroxy nitrile and recovering the precious metal so extracted.

2. A process according to claim 1 in which the precious metal is gold.

3. A process according to claim 1 in which the alpha-hydroxy nitrile is the only precious metal dissolving agent.

4. In a process of extracting cyanidable precious metals from ores containing the same in which the ore is ground and formed into an aqueous pulp, the improvement which comprises subjecting said aqueous pulp to extraction in the presence of an effective amount of lactonitrile and recovering the precious metal so extracted.

5. A process according to claim 4 in which the lactonitrile is the sole precious metal dissolving agent.

6. A process according to claim 4 in which the ore is a gold ore.

7. A process according to claim 4 in which the ore is a gold and silver ore.

8. A process according to claim 1 in which the precious metal ore is a carbonaceous ore.

9. A process according to claim 4 in which the precious metal ore is a carbonaceous ore.

References Cited in the file of this patent

UNITED STATES PATENTS

| 2,293,066 | Lord | Aug. 18, 1942 |
| 2,729,557 | Booth et al. | Jan. 3, 1956 |